United States Patent [19]
Grass et al.

[11] Patent Number: 5,301,083
[45] Date of Patent: Apr. 5, 1994

[54] REMOTE CONTROL RESIDENTIAL CIRCUIT BREAKER

[75] Inventors: William E. Grass, Milwaukee; Peter K. Moldovan, Cascade; Earl T. Piber, Oconomowoc; Robert J. Clarey, Brookfield; James R. Jaeschke, Waukesha; Robert A. Kihn, Menomonee Falls; Richard G. Smith, Milwaukee; Herbert R. Streich, Whitefish Bay, all of Wis.

[73] Assignee: Eaton Corporation, Cleveland, Ohio

[21] Appl. No.: 768,029

[22] Filed: Sep. 30, 1991

[51] Int. Cl.$^5$ .......................................... H01H 73/00
[52] U.S. Cl. ..................................... 361/64; 361/66; 361/115; 335/14; 335/20
[58] Field of Search ................ 361/115, 64, 68, 66, 361/93; 335/14, 20

[56] References Cited

U.S. PATENT DOCUMENTS

| | | | |
|---|---|---|---|
| Re. 33,325 | 9/1990 | Yokoyama et al. | 335/14 |
| 3,081,386 | 3/1963 | Koenig et al. | 335/9 |
| 4,088,973 | 5/1978 | Kussy et al. | 335/6 |
| 4,164,719 | 8/1979 | Young et al. | 335/14 |
| 4,167,716 | 9/1979 | Horn | 335/14 |
| 4,178,572 | 12/1979 | Gaskill et al. | 335/14 |
| 4,434,413 | 2/1984 | Pelletier et al. | 337/71 |
| 4,529,951 | 7/1985 | Youichi et al. | 335/13 |
| 4,531,172 | 7/1985 | Mertz | 361/13 |
| 4,532,486 | 7/1985 | Terrier | 335/13 |
| 4,549,153 | 10/1985 | Forsell et al. | 335/16 |
| 4,616,206 | 10/1986 | Bridges et al. | 337/71 |
| 4,623,859 | 11/1986 | Erickson et al. | 335/14 |
| 4,879,535 | 11/1989 | Mori et al. | 335/14 |
| 4,897,625 | 1/1990 | Yokoyama et al. | 335/14 |
| 4,929,919 | 5/1990 | Link et al. | 335/38 |
| 4,947,145 | 8/1990 | Ohishi et al. | 335/14 |

FOREIGN PATENT DOCUMENTS

| | | |
|---|---|---|
| 0364950 | 4/1990 | European Pat. Off. |
| 2719053 | 11/1977 | Fed. Rep. of Germany |
| 2020903 | 11/1979 | United Kingdom |
| 2086658 | 5/1982 | United Kingdom |

*Primary Examiner*—Todd Deboer
*Attorney, Agent, or Firm*—Andrus, Sceales, Starke & Sawall

[57] ABSTRACT

A remote control residential and commercial lighting and appliance branch circuit breaker provides both overload current protection and load management. Structure is provided enabling packaging in a three-quarter inch width case, including a first set of contacts in the case provided by a pair of separable overload breaker contacts, trip structure in the case for causing separation of the overload breaker contacts in response to overload currents therethrough, a second set of contacts in the case provided by a pair of switching relay contacts having open and closed conditions and electrically connected in series with the overload breaker contacts, and an actuator in the case energizable to mechanically actuate the switching relay contacts. Feedback circuitry is included providing status indication of the condition of the switching relay contacts. Structure is provided for reducing actuator and spring requirements and sizes.

36 Claims, 8 Drawing Sheets

REMOTE CONTROL RESIDENTIAL CIRCUIT BREAKER

BACKGROUND AND SUMMARY

The invention relates to a remote control residential and commercial circuit breaker providing overload current protection and load management.

Circuit breakers provide overcurrent protection for preventing personal injury and property damage. A loadcenter or panelboard receives electrical power from the utility company transformer and routes the electrical power through a main circuit breaker and then through branch circuit breakers to designated branch circuits, each supplying current to one or more electrical loads. The circuit breakers are designed to interrupt the electrical current if it is excessive or outside the design limits of the conductor and loads, to reduce the risk of injury and damage. Branch circuit breakers are provided in narrow width molded cases which fit into designated slots or pole openings in the panelboard. The two most common widths for such circuit breakers are one inch and three-quarter inch, which is the outside width dimension of the molded case.

A circuit breaker has a thermal/magnetic trip characteristic. The thermal characteristic is operative in response to overload current of extended duration which heats a bimetal member, causing movement of the latter, which in turn releases a latch to trip open a set of contacts. For example, the thermal characteristic would respond to 30 amps being drawn in a 15 amp circuit. The magnetic characteristic is operative in response to a sudden high magnitude current overload condition, and uses the magnetic field generated in a magnetic core to attract an armature, which movement releases the latch to open the contacts. As an example, the magnetic type actuation occurs in response to a short circuit wherein the hot line conductor becomes directly connected with ground or neutral, bypassing the load.

It is known in the prior art to provide remote controlled circuit breakers wherein the breaker contacts are tripped to an open condition by an actuator responding to a control signal. This enables the circuit breaker to additionally perform a switching function and manage a load connected to the breaker, such that the breaker performs the dual functions of overload current protection and load management. A disadvantage of using the breaker contacts to perform a switching relay type function is that the breaker contacts are designed to be able to interrupt high current, not for repeated operation.

The present invention provides a circuit breaker with a first set of contacts provided by a pair of separable overload breaker contacts for overload current protection, and a second set of contacts provided by a pair of switching relay contacts having open and closed conditions and electrically connected in series with the overload breaker contacts and providing load management. Trip structure causes separation of the overload breaker contacts in response to overload currents therethrough. An actuator is energizable to mechanically actuate the switching relay contacts.

In one aspect of the invention, feedback circuitry responsive to the actuator provides status indication of the condition of the switching relay contacts, and in turn the managed load.

In another aspect, the noted structure is provided in a common case, and concurrent heating of the case by both the overload current trip structure and a solenoid actuator is prevented. Only one or the other of such trip structure and such solenoid is allowed to heat the case.

In another aspect, structure is provided enabling packaging within a narrow case of standard width of one inch or less. A negative gradient acting spring and particular orientation reduces the holding requirements of an actuating solenoid for the switching relay contacts, which reduced holding requirements enables use of a small solenoid, facilitating the noted packaging. In a further aspect, magnetic flux coupling structure is provided adjacent a movable contact arm of the switching relay contacts and provides a hold down electromagnet holding the switching relay contacts in the closed condition in response to overload currents therethrough such that the switching relay contacts remain closed and resist blow-apart force, and instead the circuit is interrupted by the overload breaker contacts in response to the overload current. The magnetic flux coupling structure providing the hold down electromagnet urges the switching relay contacts to the closed condition with increasing force with increasing current flow therethrough, which in turn reduces the holding requirements of the noted negative gradient acting biasing spring under overload current conditions, which in turn further reduces the holding requirements and size of the actuating solenoid, further facilitating the noted packaging.

DETAILED DESCRIPTION

Figure 1:
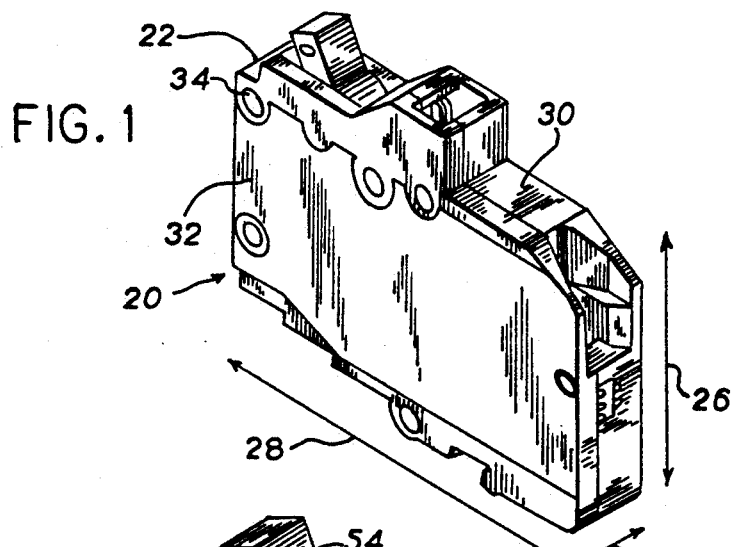
FIG. 1 is a perspective view of a circuit breaker in accordance with the invention.

Residential and commercial lighting and appliance branch circuit breakers of the narrow width type are known in the prior art, for example Cutler-Hammer Model 403, commercially available from Cutler-Hammer, Eaton Corporation, 4201 North 27th Street, Milwaukee, Wis. 53216, and also for example as shown in U.S. Pat. Nos. 3,081,386, 4,549,153, 4,616,206, and 4,929,919, incorporated herein by reference. Such circuit breakers provide overload current protection. The two most common widths for such circuit breakers are three-quarters inch, and one inch, which is the outside width dimension of the molded case.

The present drawings show a remote control residential and commercial lighting and appliance branch circuit breaker 20 providing overload current protection and also providing load management. The breaker is housed in a molded insulating case 22 having a width 24 of three-quarters inch, a height 26 of three and one-quarter inches, and a length 28 of four inches.

Case 22 includes a rear base portion 30 and a front cover 32 attached to base 30 by rivets 34. The interior of the case has left and right compartments 36 and 38, FIG. 2, separated by a dividing wall 40 extending integrally forwardly from the back wall 42 of base 30. The breaker includes a first set of contacts in the case provided by a pair of separable overload breaker contacts 44, 46 in left compartment 36, and trip structure 48 in left compartment 36 of the case for causing separation of the overload breaker contacts in response to overload currents therethrough. The trip structure is known in the art, for example in the above noted Cutler-Hammer 403 breaker, and will only be briefly described.

A molded insulating operator 50 is rotatably journaled on cylindrical bosses, one of which is shown at 52, received in recesses formed in base 30 and cover 20. Operating handle 54 of operator 50 extends upwardly through opening 56 in the case for external manual operation of the breaker. Operator 50 has a depending leg 58, FIG. 3, extending on the opposite side of its rotational axis from handle 54. Leg 58 is comparable to leg 20b in FIG. 2 of above incorporated U.S. Pat. No. 4,929,919, and has an aperture 60 receiving tab 62 of movable contact arm 64 to pivotally attach movable contact arm 64 to operator 50. Movable contact arm 64 has movable contact 46 mounted thereto for engagement with stationary contact 44 mounted to stationary contact terminal arm and clip 66 at the lower left corner of compartment 36 of the case for external circuit connection to the line side of the circuit, FIG. 13.

Figure 2:
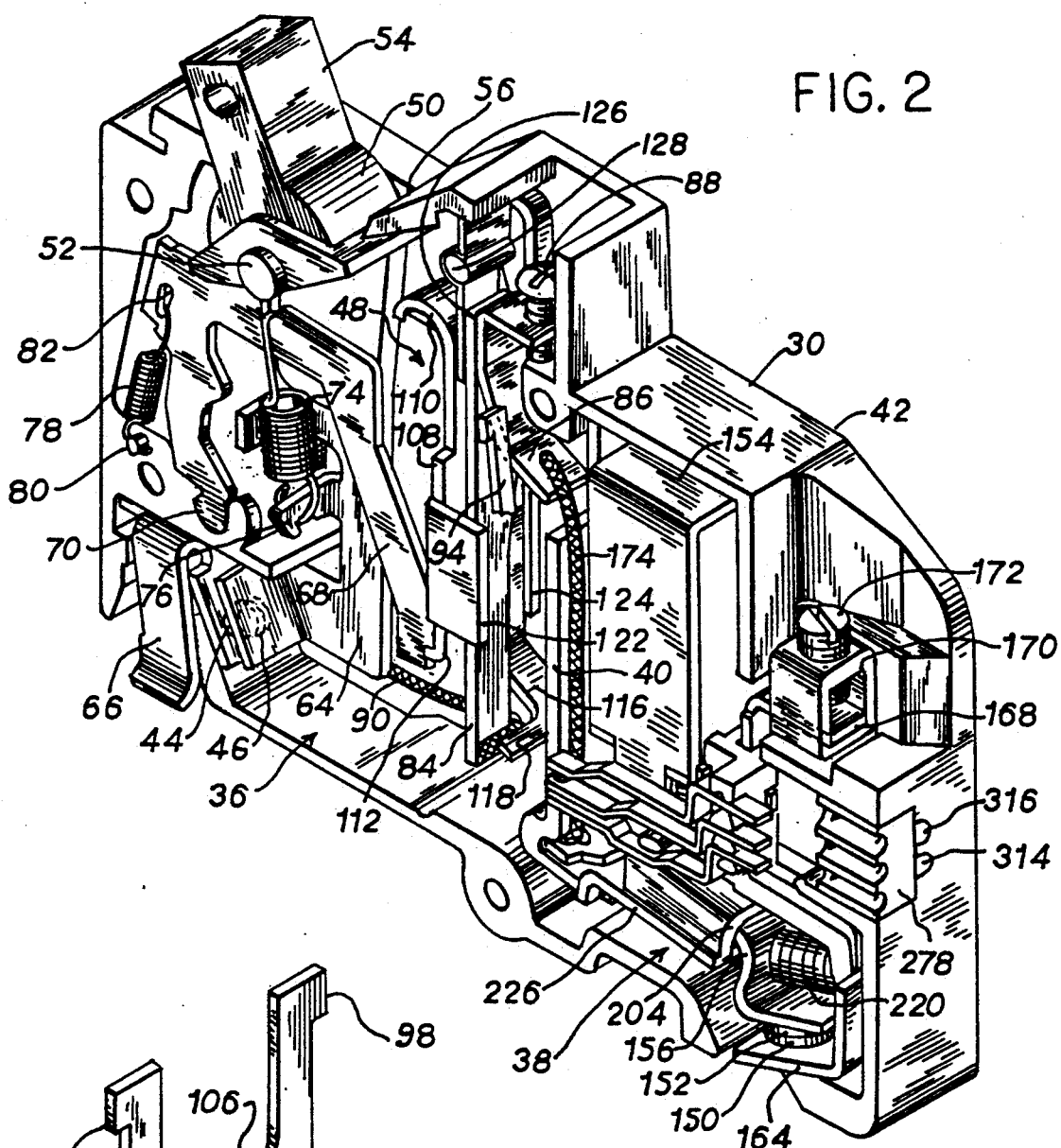
FIG. 2 is an enlarged view like FIG. 1, but with the front cover removed.
Figure 3:
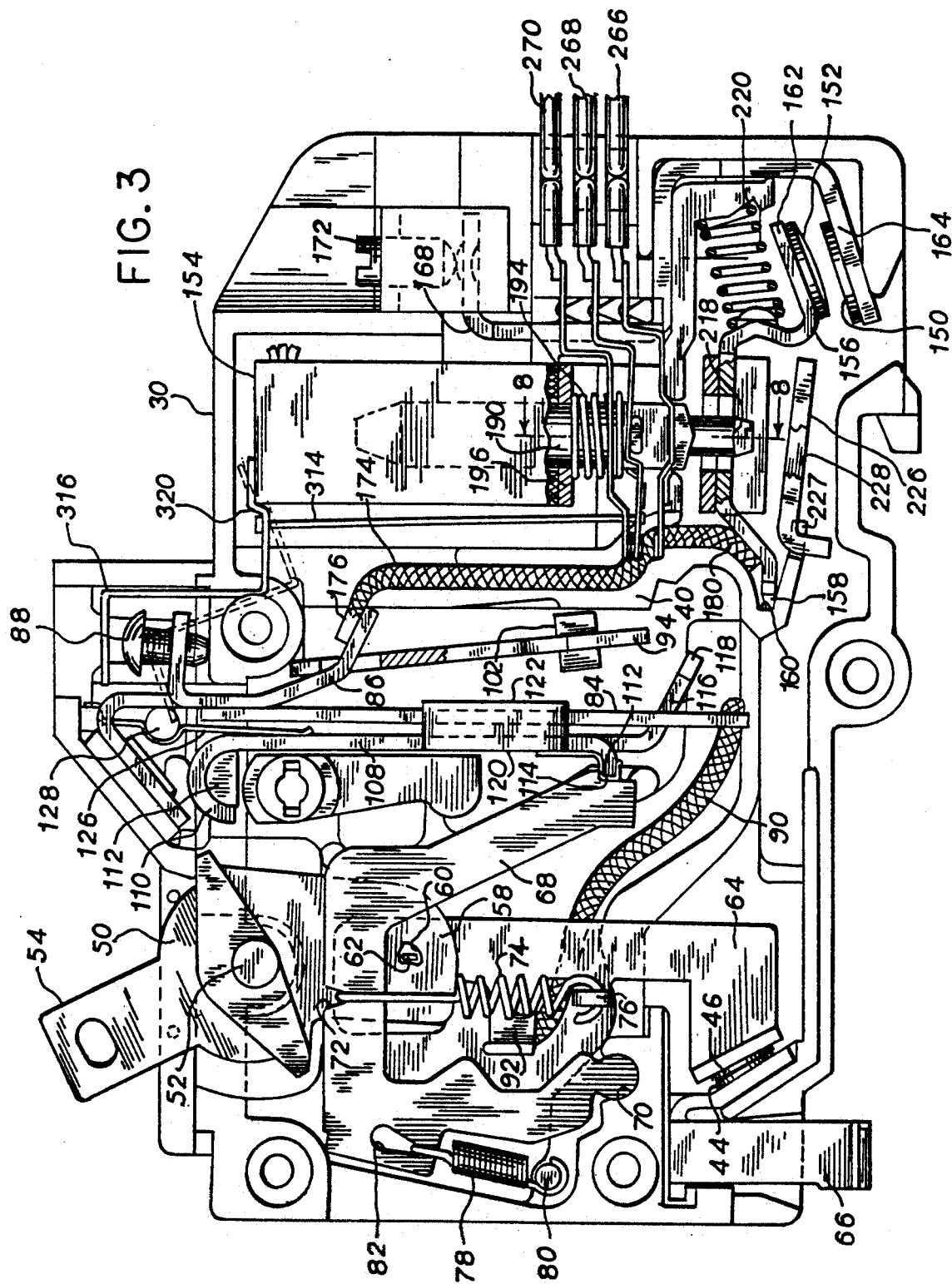
FIG. 3 is a side elevation view of the structure of FIG. 2.

A generally inverted U-shaped latch lever 68, comparable to latch lever 22 in FIG. 2 of incorporated U.S. Pat. No. 4,929,919, is pivotally mounted at its left end within a semi-cylindrical recess 70 in base 30. Latch lever 68 has a notch 72 formed approximately centrally thereof which receives the upper hooked end of a spring 74. The opposite bottom hooked end of spring 74 is connected to movable contact arm 64 at tab 76. Spring 74 connects latch lever 68 to movable contact arm 64 under tension, thereby biasing movable contact arm 64 clockwise about its pivotal attachment to operator 50 and biasing latch lever 68 clockwise about the pivot formed at recess 70. In the ON position of the breaker shown in FIG. 3, spring 74 provides contact closing force for breaker contacts 44 and 46. A second helical tension spring 78 is connected between a boss 80 of base 30 and the left leg of latch lever 68 at aperture 82, in opposition to the bias provided by spring 74. Spring 78 operates to automatically reset latch lever 68 and the breaker mechanism after the breaker has tripped and to move handle 54 to the OFF position. When the circuit breaker is in its ON state as shown in FIG. 3, spring 78 is almost fully relaxed, providing little opposing bias to latch lever 68. However, when the circuit breaker trips and latch lever 68 moves in a clockwise direction about pivot 80, spring 78 becomes stretched to provide a reverse or counterclockwise bias to latch lever 68, to be described, thereby urging latch lever 8 back to a reset position.

A current sensing bimetal and magnet structure assembly is located in left compartment 36 and to the right of latch lever 68. A bimetal member 84 is affixed at its upper end such as by welding, soldering, or the like, to a support conductor 86 which is positioned between back wall 42 of base 30 and front cover 32 and includes an adjustment screw 88. By turning screw 88 clockwise, support member 86 rocks counterclockwise, to move the lower end of bimetal member 84 rightwardly. By turning screw 88 counterclockwise, support member 86 rocks clockwise, to move the lower end of bimetal member 84 leftwardly. The adjustable positioning of the lower end of bimetal member 84 in this manner calibrates the predetermined current at which the breaker will trip.

Figure 12:
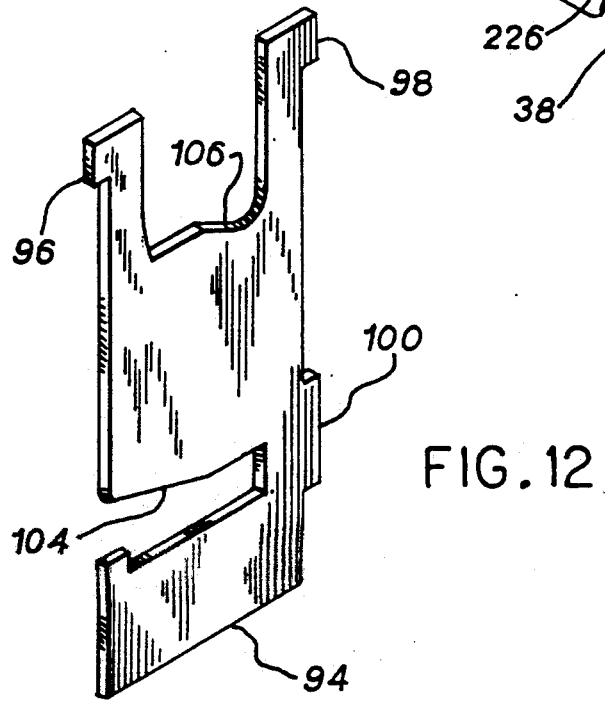
FIG. 12 is a perspective view of one of the components of FIG. 3.

A flexible braided pigtail conductor 90 is affixed at its right end to the lower or free end of bimetal member 84 by soldering, welding, brazing or the like. The opposite left end of pigtail conductor 90 is similarly affixed to movable contact arm 64 at tab 92. The magnetic structure for the breaker includes an elongated pole piece 94, FIGS. 3 and 12, having upper ears 96 and 98 received in recesses in back wall 42 of case 30 and in front cover 32 from which pole piece 94 depends downwardly and swings in an arc as guided and limited by tab 100 in recess 102 in back wall 42 of base 30. The pole piece 94 used is that from ground fault interrupter structure where slots 104 and 106 retain a coil (not shown) wound on the pole piece, which coil is not used in the present implementation. Armature 108 has an upper end 110 hooked around boss 112 of base 30, and a lower end 112 hooked in notch 114 of latch lever 68. Armature 108 has a lower leg 116 extending downwardly and rightwardly behind bimetal 84 and having a forwardly extending tab 118, FIGS. 2 and 3. The central portion 120 of armature 108 is U-shaped in horizontal cross-section and has rightwardly extending forward and rearward legs 122 and 124 straddling bimetal member 84 and extending towards pole piece 94. Leaf spring 126 is hooked around boss 128 of base 30 and biases armature 108 to rock clockwise about boss 112 such that the lower end 112 of armature 108 is biased leftwardly.

In operation, current from a supply source is fed to the breaker through terminal 66 and stationary contact 44 to movable contact 46, movable contact arm 64, pigtail conductor 90, and bimetal member 84 and support conductor 86 for connection to the remainder of the breaker structure, to be described, and then to the branch circuit and load to be protected and managed, and then returned to the power supply. In the event of a prolonged, low grade fault current condition, bimetal member 30 will heat due to the overcurrent, and the lower end of bimetal member 84 will deflect rightwardly and engage tab 118 to pull leg 116 and armature 108 rightwardly thereby pulling lower end 112 of the armature from engagement with notch 114 of latch lever 68. When so released, latch lever 68 pivots clockwise about pivot 70 under the influence of spring 74. Clockwise movement of latch lever 68 carries the upper end of spring 74 across the plane of the pivot provided by tab 62 in aperture 60 in operator 50, to effect counterclockwise movement of movable contact arm 64 about this pivotal connection, thereby separating movable contact 46 from stationary contact 44. This movement of contact arm 64 shortens the operating length of spring 74, relaxing it to a nearly solid condition having its line of action directed to the left of the pivot of the operator, thereby applying a clockwise moment to the operator. Thereafter, spring 78 urges latch lever 68 counterclockwise to its reset position, moving contact arm 68 and spring 74 therewith. Spring 74 then becomes fully relaxed and acts as a solid link to rotate operating handling 54 to a rightward OFF position of the breaker, as shown in dashed line in FIG. 2 of incorporated U.S. Pat. No. 4,929,919.

When bimetal member 84 cools and returns to its original, normal position, the lower end of bimetal member 84 moves back leftwardly away from tab 118, and armature 108 rocks clockwise about boss 112 under the influence of spring 126 such that lower end 112 of armature 108 moves leftwardly into engagement with notch 114, thereby to re-latch the breaker mechanism. Subsequent rotation of operator 50 counterclockwise about pivot 52 to move handle 54 leftwardly to the ON position carries the pivot connection 60, 62 of operator 50 and movable contact arm 64 over-center of the line of action of spring 74, thereby closing movable contact 46 against stationary contact 44.

In the event of a sudden large increase in current flow through the breaker, the magnetic structure takes over to rapidly trip the circuit breaker before the bimetal member 84 has a chance to respond to the increased current. Current flow from pigtail conductor 90 through bimetal member 84 induces a magnetic flux within U-shaped armature central portion 120, thereby to attract pole piece 94 leftwardly until tab 100 is stopped at the left edge of recess 102, whereafter armature 108 is attracted rightwardly toward pole piece 94 to move lower latching end 112 of the armature out of engagement with notch 114, to release latch lever 68 as above described.

Overload breaker contacts 44, 46 and trip structure 48 are in left compartment 36 of case 22 to the left of dividing wall 40, FIGS. 2 and 3. To the right of dividing wall 40 in right compartment 38 of the case is a pair of switching relay contacts 150 and 152, and an actuator 154 energizable to mechanically actuate the switching relay contacts between a normally closed condition, FIGS. 2 and 6, and an open condition, FIG. 3. Contact 152 is a movable contact mounted on a movable contact arm 156 having a left end pivot point 158 pivotally mounted in the case at a bearing recess 160 at the bottom of dividing wall 40. Movable contact 152 is soldered, welded, brazed or the like to the right end of contact arm 156 at a contact engagement point 162. Contact 150 is a stationary contact mounted by soldering, welding, brazing or the like to the lower portion 164 of a stationary terminal 166 having an S-shaped configuration, FIG. 4, with an upper portion 168 in lug 170 having tightening screw 172 for connection to the load side conductor of a branch circuit.

Figure 13:
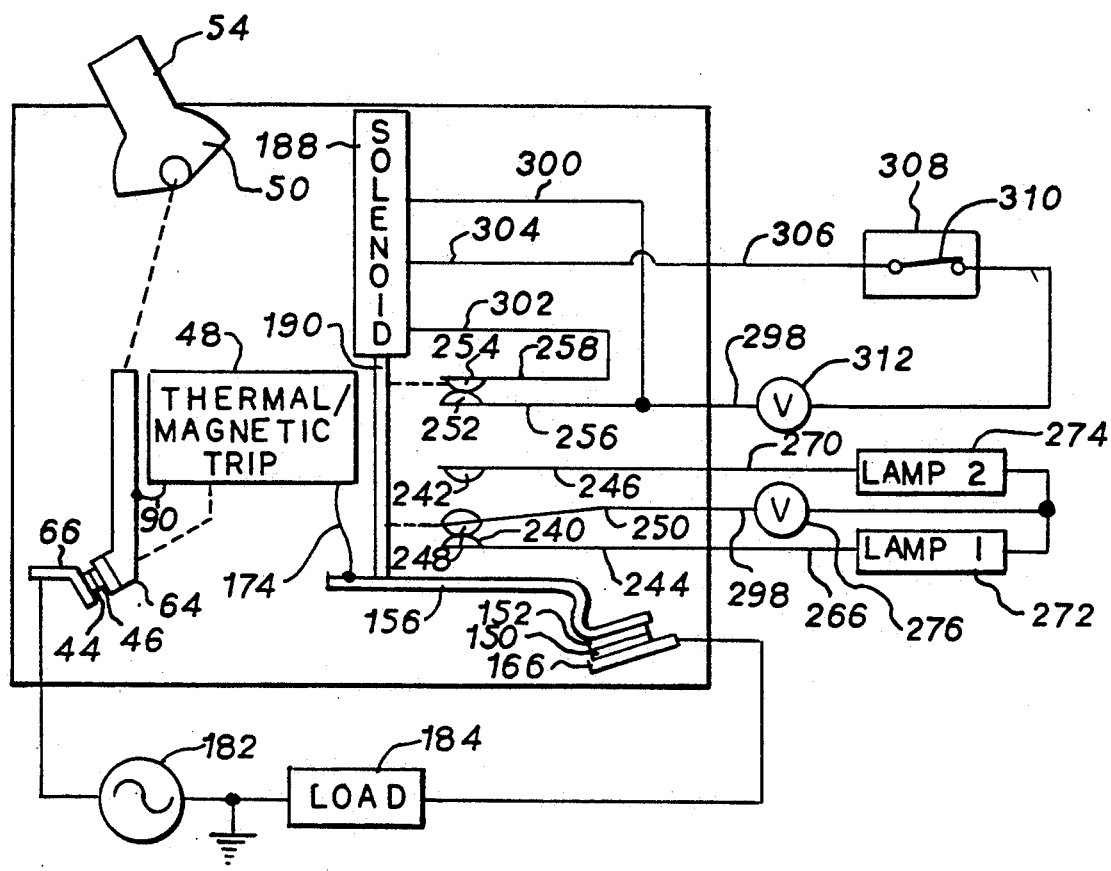
FIG. 13 is a schematic circuit diagram.

A flexible braided pigtail conductor 174 has an upper end 176 affixed by soldering, welding, brazing or the like to support conductor 86 at the upper end of bimetal member 84. Pigtail conductor 174 extends rightwardly through a passage 178, FIG. 4, in the upper portion of dividing wall 40 and then axially vertically downwardly along the right side of dividing wall 40, between dividing wall 40 and actuator 154. The lower end 180 of pigtail conductor 174 is affixed by soldering, welding, brazing or the like to movable contact arm 156 adjacent left end pivot point 158. In this manner, switching relay contacts 150, 152 are electrically connected in series with overload breaker contacts 44, 46. The electric circuit current path, FIGS. 13 and 3, is from the power source 182 to stationary terminal 66 to breaker contacts 44, 46 to movable contact arm 64 to pigtail conductor 90 to bimetal member 84 and support conductor 86 to pigtail conductor 174 to movable contact arm 156 to relay contacts 152, 150 to stationary terminal 166 and to the branch circuit load 184.

Figure 4:
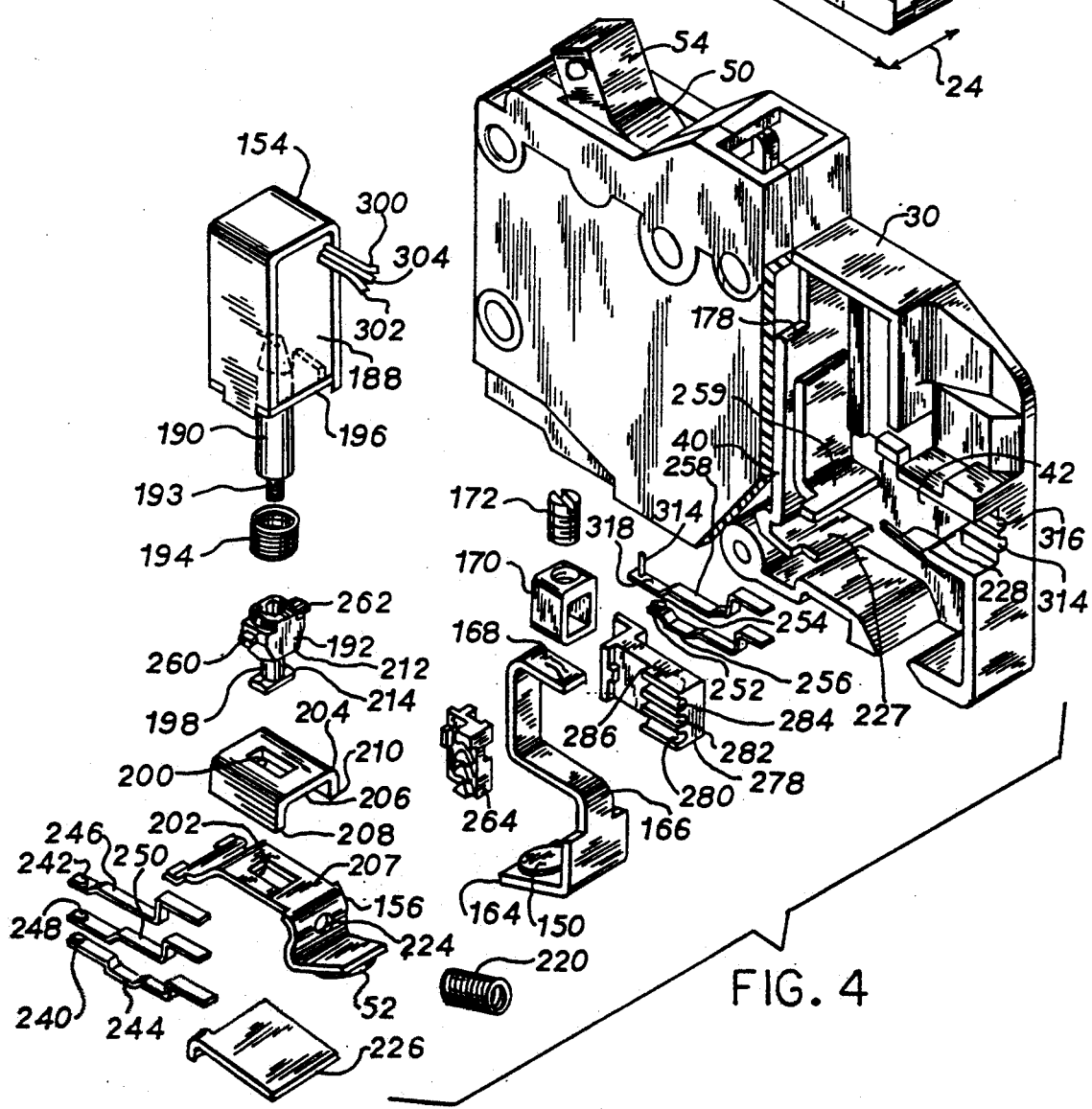
FIG. 4 is an exploded perspective view of a portion of the structure of FIG. 2.
Figure 6:
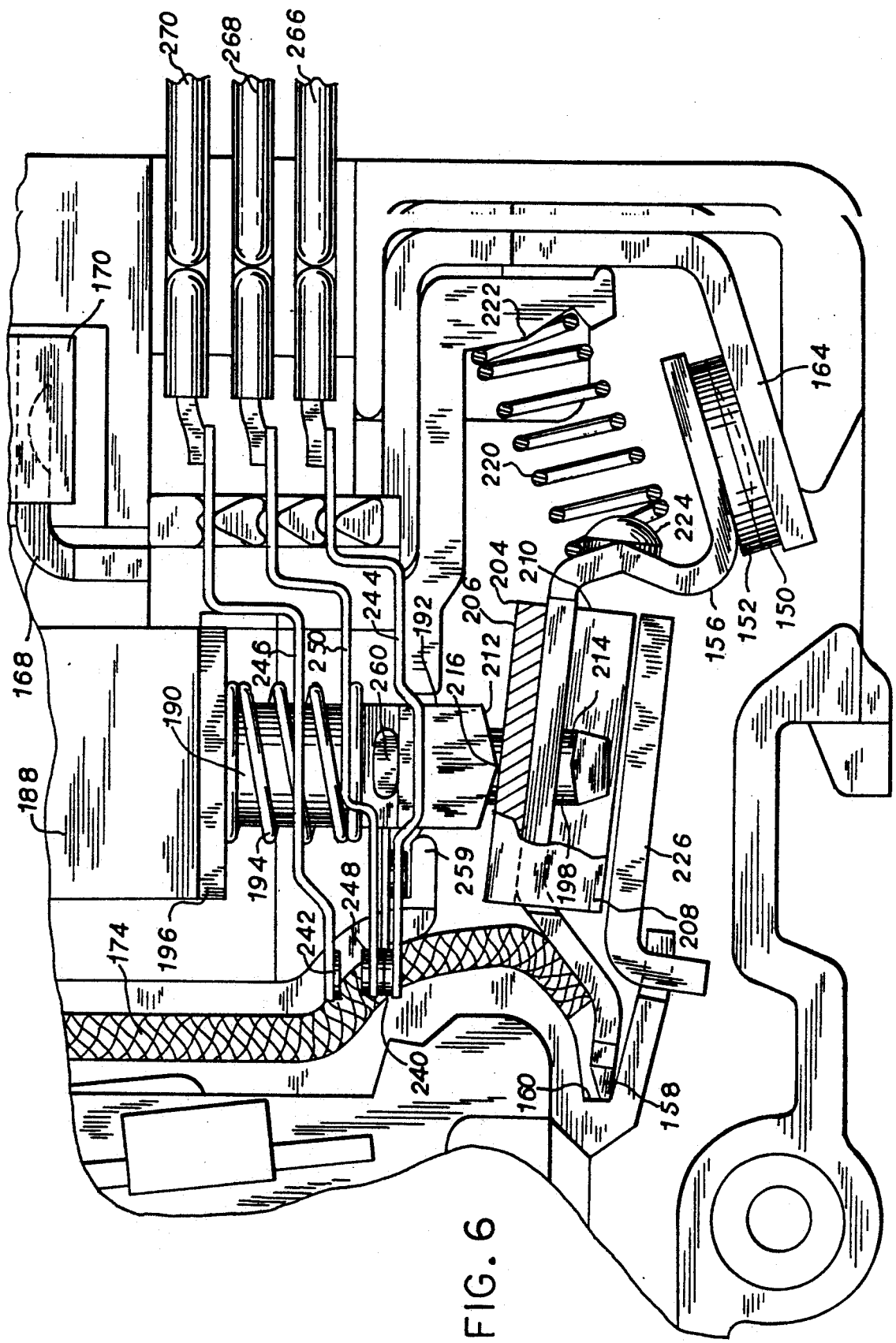
FIG. 6 is an enlarged view of a portion of the structure of FIG. 3.

Actuator 154 is provided by a solenoid 188, FIG. 4, having a movable plunger with an upper metal section 190 actuated by the solenoid to move along an axial travel path between upper and lower positions, FIGS. 3 and 6, respectively. The solenoid is provided by a Ledex Model TDS-06K from Ledex, Inc., P.O. Box 427, Vandalia, Ohio 45377-0427, though other solenoids and other actuators may be used. In the upper position of the plunger, relay contacts 150, 152 are open, FIG. 3. In the lower position of the plunger, relay contacts 150, 152 are closed, FIG. 6. The plunger includes a lower section 192 of plastic or other insulating material press fit affixed to upper section 190 at serrations 193. A spring 194 bears between lower frame plate 196 of the solenoid and lower plunger section 192 to bias the plunger axially downwardly.

Plunger section 192 has a lower shank portion 198 extending downwardly through aligned apertures 200 and 202 in respective members 204 and 156, FIG. 4. Member 204 has an inverted U-shape, with a bight 206 engaging the top central portion 207 of movable contact arm 156, and a pair of spaced legs 208 and 210 extending downwardly and straddling central portion 207. Plunger section 192 has upper and lower engagement surfaces 212 and 214, FIG. 6, axially spaced along shank 198 by a gap greater than the combined thickness of central portion 207 of movable contact arm 156 and bight 206 of member 204. In the lower position of the plunger, FIG. 6, engagement surface 212 engages the top surface of bight 206 at point 216, and engagement surface 214 is spaced below the undersurface of the central portion 207 of movable contact arm 156. In the upper position of the plunger, FIG. 3, engagement surface 214 engages the undersurface of central portion 207 of movable contact arm 156 at point 218, and engagement surface 212 is spaced above the top surface of bight 206.

Movable contact arm 156 is biased downwardly to the position in FIG. 6 by a negative gradient acting biasing spring 220. A negative gradient acting spring is preferred because it provides decreasing biasing force with increasing separation of switching relay contacts 150, 152 as plunger 192 moves upwardly from the position in FIG. 6 to the position in FIG. 3. Spring 220 bears between the case at point 222 and movable contact arm 156 at a biasing point provided by bead 24 retaining spring 220 during movement. Spring 220 is angled at an oblique angle relative to the path of movement of plunger 192 and contact arm 156 to provide the negative gradient. The oblique plane of spring 220 in FIG. 3 is slightly more horizontal than the oblique plane of spring 220 in FIG. 6. During movement between the positions in FIGS. 3 and 6, spring 220 does not travel over-center. Spring 220 continually compresses during the entire range of motion thereof in changing from the oblique plane of FIG. 6 to the oblique plane of FIG. 3 during movement of plunger 192 from its lower position to its upper position. Spring 220 continually expands during the entire range of motion thereof in changing from the oblique plane of FIG. 3 to the oblique plane of FIG. 6 during movement of plunger 192 from its upper position to its lower position. Relay contacts 150, 152 engage, FIG. 6, along a plane obliquely angled relative to the direction of movement of plunger 192. The oblique plane of engagement of contacts 150, 152 is generally parallel to the oblique plane of spring 220.

Spaced engagement surfaces 212 and 214 along shank 198 of plunger 192 provide a lost motion coupling between the plunger and movable contact arm 156. During movement of plunger 192 from its lower position in FIG. 6 to its upper position in FIG. 3, the plunger initially moves through the lost motion, followed by hammer blow impact engagement of movable contact arm 156 by engagement surface 214 of plunger 192 to aid in the breaking of any tack welds between switching relay contacts 150, 152, followed by continued movement of plunger 192 upwardly against the decreasing bias of spring 220. The oblique angled plane of engagement of contacts 150, 152 also facilitates the breaking of tack welds.

Magnetic flux coupling structure, including an armature provided by member 204 and a pole piece 226, provide a hold down electromagnet adjacent movable contact arm 156 and urging switching relay contacts 150, 152 to the closed condition, FIG. 6, with increasing force with increasing current flow therethrough, thus preventing blow-apart of the relay contacts 150, 152. This reduces the holding requirements of spring 220 under overload current conditions, such that relay contacts 150, 152 remain closed, and breaker contacts 44, 46 break the circuit in the event of overload current. Pole piece 226 is stationary and has a left end located on the bottom rightwardly turned end 227 of dividing wall 40, and has a rear edge located in elongated recess 228 in back wall 42 of base 30. Legs 208 and 210 of U-shaped armature 204 extend downwardly toward and are movable into close proximity with pole piece 226 upon downward movement of contact arm 156. In an alternate embodiment, the magnetic flux coupling structure is instead provided by a non-inverted U-shaped member below the movable contact arm.

A feedback circuit is responsive to energization of actuator 154 to provide status indication of the condition of switching relay contacts 150, 152. A third set of contacts is provided by auxiliary feedback contacts including axially spaced contacts 240 and 242, FIG. 4, mounted on respective contact terminals 244 and 246, and a contact 248 axially movable between contacts 240 and 242 and mounted on a movable contact arm 250 lying in the path of movement of and engaged by plunger 192 during axial movement thereof. There is also provided a fourth set of contacts providing actuator energization control contacts including axially spaced contacts 252 and 254 mounted respectively on contact terminal 256 and movable contact arm 258. Contact 254 is axially movable into and out of engagement with contact 252, and movable contact arm 258 lies in the path of movement of and is engaged by plunger 192 during axial movement thereof. Terminals 244 and 256 rest on the lower portion of a shoulder 259 integrally formed with dividing wall 40. The third set of contacts 240, 242, 248 and the fourth set of contacts 252, 254 are spaced from each other transversely of the axial path of movement of plunger 192 and on opposite sides of the plunger. Plunger 192 has distally opposite trunnions 260 and 262 extending outwardly therefrom and respectively engaging movable contact arms 250 and 258. When plunger 192 is in its downward position, FIG. 6, contact 248 engages contact 240, and contact 254 engages contact 252. When plunger 192 is in its upward position, FIG. 3, contact 248 engages contact 242 and is separated from contact 240, and contact 254 is separated from contact 252.

Figure 10:
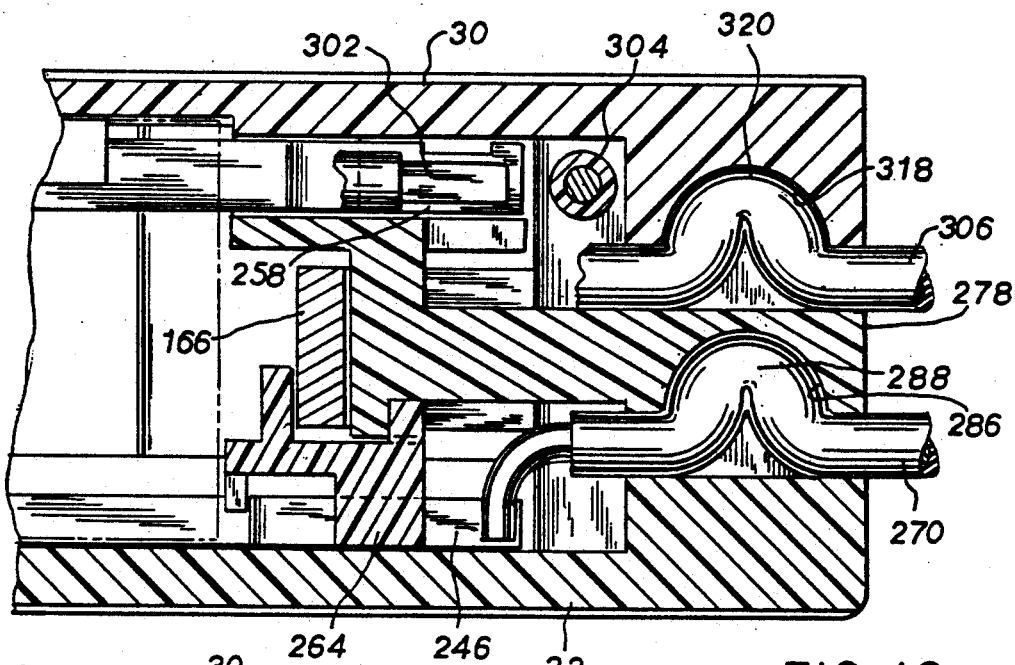
FIG. 10 is a sectional view taken along line 10—10 of FIG. 9.
Figure 9:
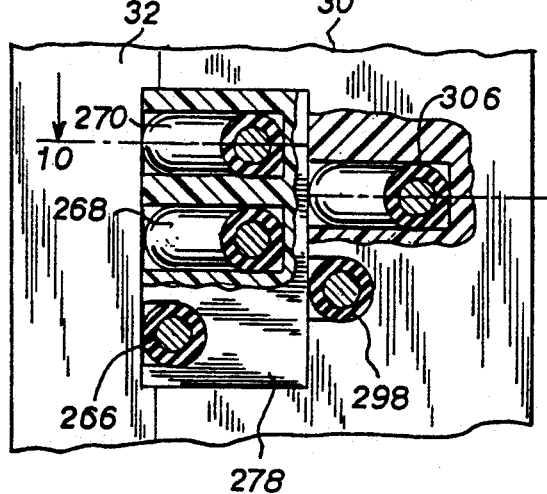
FIG. 9 is an end view, partially broken away, of a portion of the structure of FIG. 1.
Figure 11:
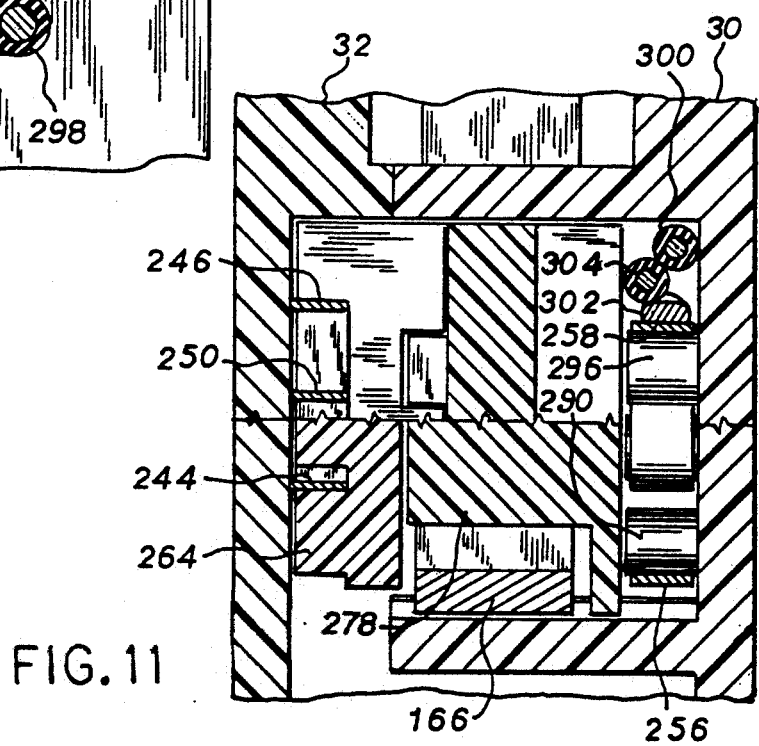
FIG. 11 is a sectional view taken along line 11—11 of FIG. 7.

Contact terminals 244, 250, 246 have rightward ends secured by a retaining block 264, and affixed by soldering, welding, brazing, mechanical crimping or the like to respective conductors 266, 268, 270 extending externally of the case for connection to indicator circuitry, FIG. 13, having a pair of indicator lamps 272 and 274 and a voltage source 276. Conductors 266, 268, 270 extend through a retainer block 278, FIG. 4, having respective guide slots 280, 282, 284, each with a semicircular recess such as recess 286 for slot 284, FIGS. 4, 5 and 10. The U-shaped recess receives a U-shaped bend in the respective conductor, such as U-shaped bend 288, FIGS. 5 and 10, of conductor 270, for trapped retention of the conductor.

When plunger 192 is in its downward position, FIG. 6, contacts 248 and 240 are closed, which completes a circuit through voltage source 276 and lamp 272, FIG. 13, whereby illumination of lamp 272 indicates that relay contacts 150 and 152 are closed, which in turn indicates that current is being supplied to load 184 (in the absence of a tripped condition of breaker contacts 44, 46), thus providing load management information and positive feedback indication. When plunger 192 is in its upper position, FIG. 3, contacts 248 and 242 are closed, which completes a circuit through voltage source 276 and a lamp 274, whereby illumination of lamp 274 indicates that relay contacts 150 and 152 are open, which in turn indicates that current is not being supplied to load 184, and hence such load has been shed for load management or other purposes.

Figure 5:
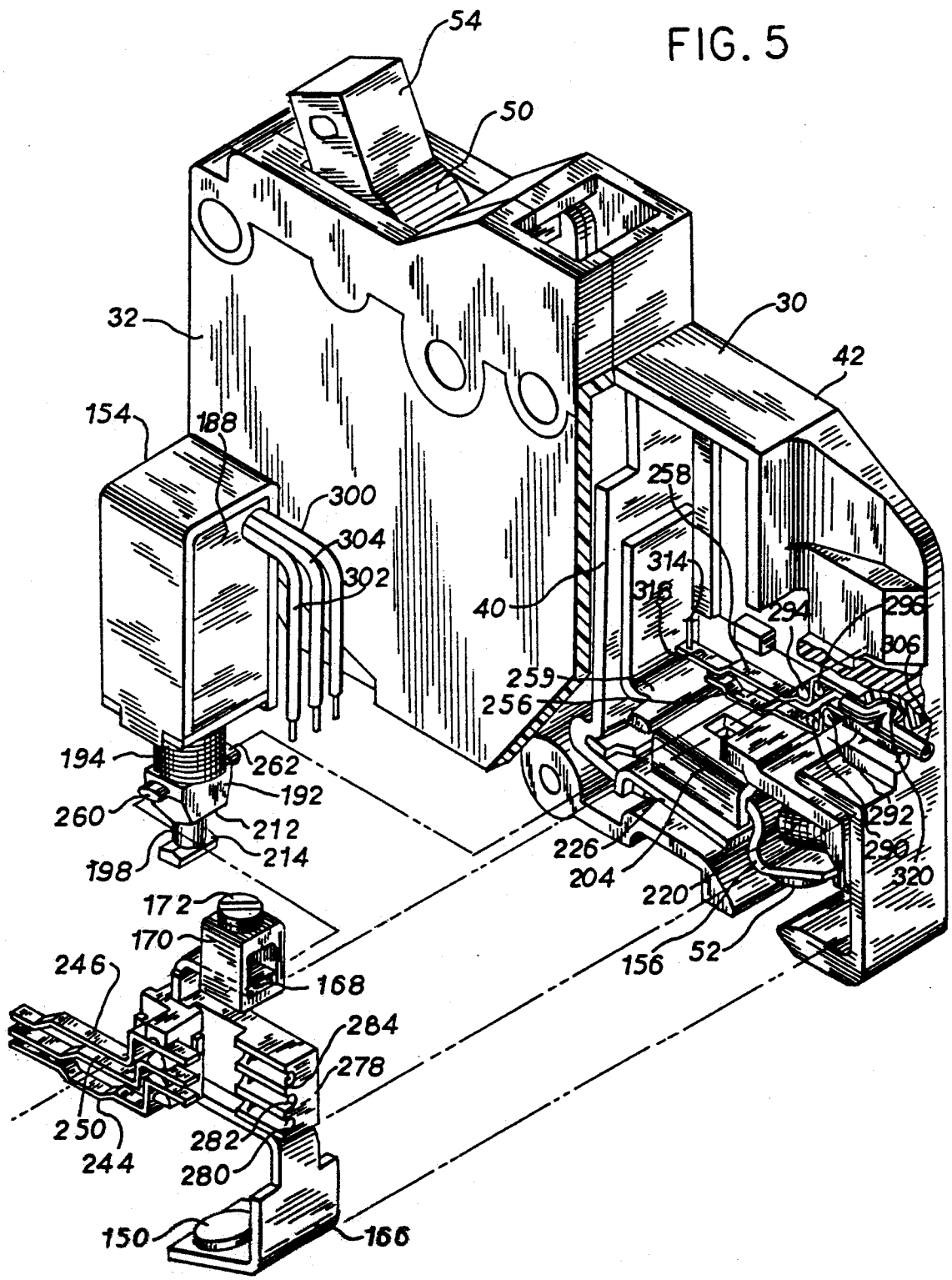
FIG. 5 is like FIG. 4 and shows partial assembly.
Figure 7:
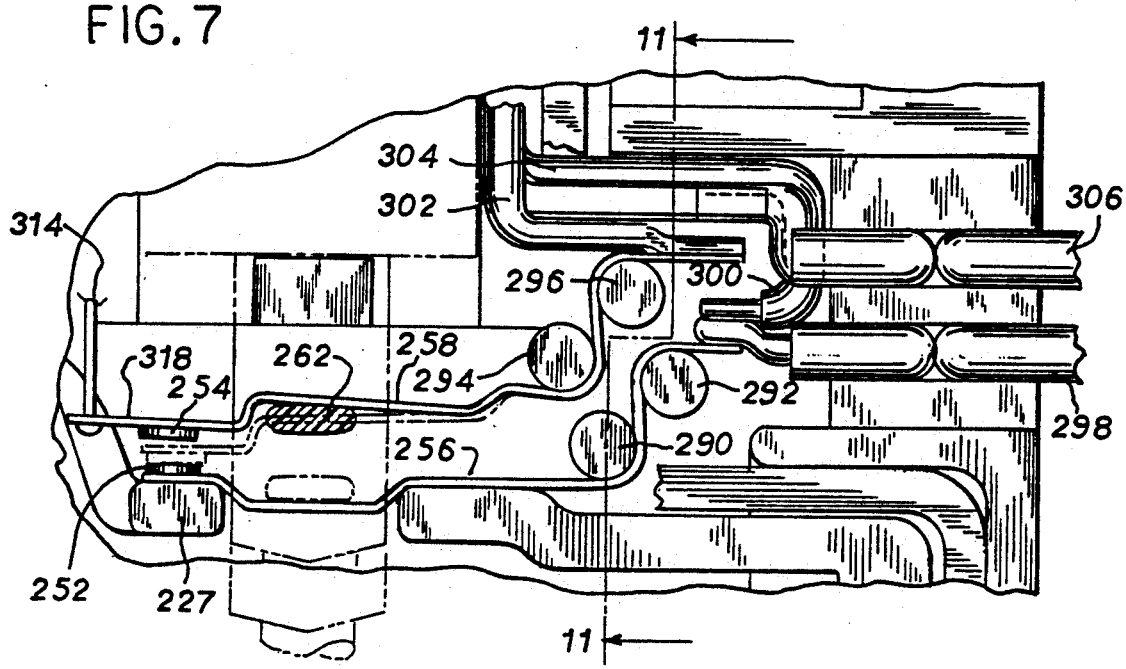
FIG. 7 is an enlarged side view of a portion of the structure of FIG. 5.
Figure 8:
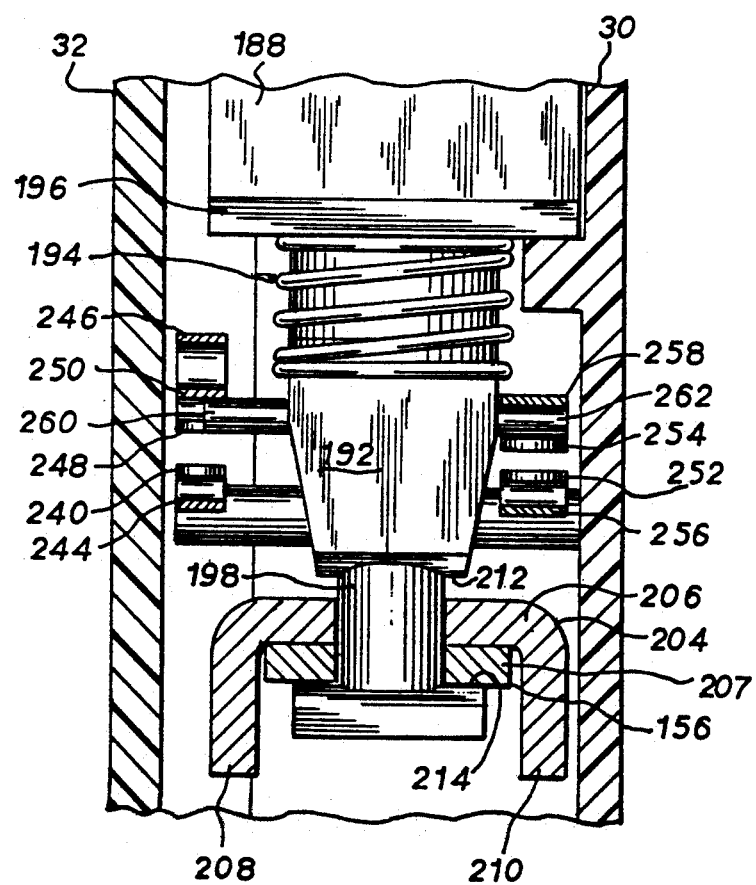
FIG. 8 is a sectional view taken along line 8—8 of FIG. 3.

Contact terminals 256 and 258 have rightward ends retained by respective bosses 290, 292 and 294, 296, FIGS. 5 and 7, extending integrally from back wall 42 of base 30. The right end of terminal 256 is affixed by soldering, welding, brazing, mechanical crimping or the like to a conductor 298, FIGS. 7 and 13, extending externally of the case, and to a conductor 300, FIGS. 7, 13 and 4, connected to solenoid 188. The right end of terminal 258 is affixed to conductor 302 which is connected to the solenoid. The solenoid has a third conductor 304 which is connected to a conductor 306 extending externally of the case. The external circuitry includes a remote control source 308, FIG. 13, including a switch 310 for completing a circuit through voltage source 312 between conductors 298 and 306. Conductors 298 and 306 extend through respective slots 314 and 316 in the case, FIGS. 2 and 4, and each slot has a semicircular recess for receiving a U-shaped bend of the respective conductor, for example recess 318 receiving U-shaped bend 320 of conductor 306, FIGS. 5 and 1, to retain the respective conductor.

The noted Ledex solenoid 188 includes a pickup coil energized by control signal current on conductor 302, and a holding coil energized by control signal current on conductor 300. Conductor 304 provides a common return. When the relay contacts 150, 152 are closed, the solenoid plunger 190 is in its downward position, FIG. 6. When it is desired to shed load 184, remote switch 31 is closed, which completes a circuit from voltage source 312 through conductor 298, terminal 256, contacts 252, 254, terminal 258 and conductor 302 to the pickup coil of solenoid 188, which circuit is returned through conductor 304, conductor 306 and closed switch 310 to source 312. A circuit is also completed from voltage source 312 through conductor 298, and terminal 300 to energize the holding coil of solenoid 188. Energization of the pickup coil and holding coil of the solenoid causes upward retraction of the solenoid plunger to the position shown in FIG. 3, to open relay contacts 150, 152, and hence stop current flow to load 184. During upward movement of the plunger, trunnion 262 engages the underside of contact terminal arm 258 to move contact 254 upwardly out of engagement with contact 252, to break the circuit to the solenoid pickup coil. Only the holding coil is necessary to hold the plunger in its upward position. The bias of spring 194 is small and easily overcome.

The negative gradient acting of spring 220 facilitates the use of a small solenoid with reduced holding requirements, thus enabling packaging in the noted three-quarter inch width breaker case. The noted magnetic flux coupling structure 204, 226 providing a hold down electromagnet urging the switching relay contacts 150, 152 to their closed condition with increasing force with increasing current flow therethrough, also reduces the holding requirements of spring 220 under overload current conditions, which reduced requirements of spring 220 further reduces the solenoid holding requirements, further facilitating the noted packaging in a three-quarter inch width breaker case.

In an alternate embodiment, further indication is provided by a mechanical link 314, FIG. 3, and indicator flag 316 actuated by movement of the solenoid plunger to indicate status of the latter. Mechanical link 314 extends axially downwardly and is connected to movable contact arm 258 at extension 318, FIG. 4, extending leftwardly beyond contact 252. The upper end of link 314 is connected to flag 316 which is pivoted at 320 to the upper left corner of the frame of solenoid actuator 154. Flag 316 has a narrow width of about one-quarter inch such that in its downward pivoted position, shown in dashed line in FIG. 3, the flag passes in front of adjusting screw 88, and in the upward pivoted position, shown in solid line in FIG. 3, the flag allows access to adjusting screw 88. In a further alternative, link 314 is connected to movable contact arm 250.

In the construction shown, solenoid 188 and switching relay contacts 150, 152 in right compartment 38 operate independently of trip structure 48 and overload breaker contacts 44, 46 in left compartment 36. Solenoid 188 has an energized state actuating switching relay contacts 150, 152 to their open condition, and the solenoid has a non-energized state in which the switching relay contacts 150, 152 are returned to their closed condition, FIG. 3, in response to biasing spring 220. The series circuit through overload breaker contacts 44, 46 and switching relay contacts 150, 152 is broken when solenoid 188 is energized such that there is no current-induced heating of the overload trip structure 48 in left compartment 36. This avoids heating of case 22 concurrently by the trip structure in left compartment 36 and the solenoid in right compartment 38, such that the case is heated by only one of the solenoid and the trip structure at a time, not both.

The arrangement is also desirable because load 184, FIG. 13, is energized by de-energizing solenoid 188, and load 184 is de-energized by energizing solenoid 188, i.e. the branch circuit normally has power available to it to energize load 184 if desired by the user, and which the user is accustomed to. Remote control of the breaker to de-energize load 184 requires energization of solenoid 188. Hence, if no action is taken by remote controller 308 or if there is an interruption of power from voltage source 312, etc., solenoid 188 remains deenergized, and switching relay contacts 150, 152 remain closed, and the branch circuit remains energized, with power available to load 184 if desired by the local user.

Lamps 272 and 274 are local and indicate to the local user whether the branch circuit containing load 184 has been shed or not. This positive feedback indication is desirable to the user so that he knows whether a remote controller, such as the utility company, has remotely controlled the local branch circuit breaker to shed load 184 (lamp 274 is illuminated), or not (lamp 272 is illuminated). Indicating lamps or other indicators may also be provided at the remote location to provide feedback status indication to the remote controller such as the utility company. Either or both of these types of positive feedback indication are desirable particularly when load 184 has been shed, so that it is known that such load is not defective or otherwise at fault, for example to avoid an unnecessary service call for a non-operating water heater, air conditioner, furnace or the like, if such appliance has been intentionally shed.

It is recognized that various equivalents, alternatives and modifications are possible within the scope of the appended claims.

We claim:

1. A remote control residential and commercial circuit breaker providing overload current protection and load management, comprising in combination a first set of contacts comprising a pair of separable overload breaker contacts, trip structure for causing separation of said overload breaker contacts in response to overload currents therethrough, a second set of contacts comprising a pair of switching relay contacts having open and closed conditions and electrically connected in series with said overload breaker contacts, an actuator energizable to mechanically actuate said switching relay contacts, and feedback means responsive to energization of said actuator and mechanically coupled to said actuator and moved by movement of said actuator to provide status indication of the condition of said switching relay contacts.

2. The circuit breaker according to claim 1 wherein said actuator comprises a movable actuating member having a first position closing said switching relay contacts and a second position opening said switching relay contacts, and wherein said feedback means generates an electrical signal in response to movement of said movable actuating member to provide said status indication.

3. The circuit breaker according to claim 2 comprising a third set of contacts comprising auxiliary feedback contacts actuated by said movable actuating member between open and closed conditions to provide status indication of the condition of said switching relay contacts.

4. The circuit breaker according to claim 3 comprising a fourth set of contacts comprising actuator energization control contacts actuated by said movable actuating member between open and closed conditions.

5. A remote control residential and commercial circuit breaker providing overload current protection and load management, comprising in combination a first set of contacts comprising a pair of separable overload breaker contacts, trip structure for causing separation of said overload breaker contacts in response to overload currents therethrough, a second set of contacts comprising a pair of switching relay contacts having open and closed conditions and electrically connected in series with said overload breaker contacts, an actuator energizable to mechanically actuate said switching relay contacts, and feedback means responsive to energization of said actuator to provide status indication of the condition of said switching relay contacts, wherein said actuator comprises a movable actuating member having a first position closing said switching relay contacts and a second position opening said switching relay contacts, and wherein said feedback means response to movement of said movable actuating member, and comprising a third set of contacts comprising auxiliary feedback contacts actuated by said movable actuating member between open and closed conditions to provide status indication of the condition of said switching relay contacts, and comprising a fourth set of contacts comprising actuator energization control contacts actuated by said movable actuating member between open and closed conditions, wherein:

said actuator comprises a solenoid, and said movable actuating member comprises a movable plunger actuated by said solenoid to move along an axial travel path between said first and second positions;

said third set of contacts comprises first and second axially spaced contacts, and a third contact axially movable between said first and second contacts and mounted on a movable contact arm lying in the path of movement of and engaged by said plunger during axial movement thereof, such that said third contact of said third set engages said first contact of said third set when said plunger is in said first position, and said third contact of said third set engages said second contact of said third set when said plunger is in said second position, wherein closure of said first and third contacts of said third set indicates said closed condition of said switching relay contacts, and closure of said second and third contacts of said third set indicates said open condition of said switching relay contacts;

said fourth set of contacts comprises first and second axially spaced contacts, said second contact of said fourth set being axially movable between a first position engaging said first contact of said fourth set and a second position separated from said fourth contact of said fourth set, said second contact of said fourth set being mounted on a movable contact arm lying in the path of movement of and engaged by said plunger during axial movement thereof, such that said second contact of said fourth set engages said first contact of said fourth set when said plunger is in said first position, and said second contact of said fourth set is separated by said first contact of said fourth set when said plunger is in said second position.

6. The circuit breaker according to claim 5 comprising a mechanical link and indicator flag actuated by movement of said plunger to indicate status of the latter.

7. The circuit breaker according to claim 6 wherein said mechanical link is connected to one of said movable contact arms of said third and fourth sets and moved thereby to provide said indication.

8. A remote control residential and commercial circuit breaker providing overload current protection and load management, comprising in combination a first set of contacts comprising a pair of separable overload breaker contacts, trip structure for causing separation of said overload breaker contacts in response to overload currents therethrough, a pair of switching relay contacts having open and closed conditions and electrically connected in series with said overload breaker contacts, an actuator energizable to mechanically actuate said switching relay contacts, magnetic flux coupling structure comprising a hold down electromagnet applying a magnetic force opposing magnetic blow-apart force between said switching relay contacts in response to overload currents therethrough such that said switching relay contacts remain closed and the circuit is interrupted by said overload breaker contacts in response to overload currents.

9. The circuit breaker according to claim 8 further comprising a negative gradient acting spring biasing said switching relay contacts to said closed condition and providing decreasing biasing force with increasing separation of said switching relay contacts, to reduce the actuating requirements of said actuator, and enable a reduced size actuator, and wherein said electromagnet urges said switching relay contacts to said closed condition with increasing force with increasing current flow therethrough, to reduce the holding requirements of said spring under overload current conditions, to further reduce the actuating requirements of said actuator and further facilitate reduced size thereof.

10. A remote control residential and commercial circuit breaker providing in combination in a common case overload current protection and load management, comprising a first set of contacts in said case comprising a pair of separable overload breaker contacts, trip structure in said case for causing separation of said overload breaker contacts in response to overload currents therethrough, a second set of contacts in said case comprising a pair of switching relay contacts having open and closed conditions and electrically connected in series with said overload breaker contacts, biasing means in said case biasing said switching relay contacts to said closed condition, a solenoid in said case having an energized state actuating said switching relay contacts to said open condition, and having a non-energized state in which said switching relay contacts are returned to said closed condition in response to said biasing means, such that the series circuit through said overload breaker contacts and said switching relay contacts is broken when said solenoid is energized such that there is no current-induced heating of said trip structure, and avoiding heating of said case concurrently by said trip structure and said solenoid, such that said case is heated by only one of said solenoid and said trip structure at a time, not both.

11. The circuit breaker according to claim 10 wherein said overload breaker contacts and said switching relay contacts are connected in series with a load, and said load is energized by de-energizing said solenoid, and said load is de-energized by energizing said solenoid.

12. The circuit breaker according to claim 11 wherein said solenoid and switching relay contacts operate independently of said trip structure and overload breaker contacts.

13. The circuit breaker according to claim 12 wherein said case has a width less than or equal to about one inch.

14. A remote control residential and commercial circuit breaker providing overload current protection and load management, comprising in combination in a common case, a first set of contacts in said case comprising a pair of separable overload breaker contacts, trip structure in said case for causing separation of said overload breaker contacts in response to overload currents therethrough, a second set of contacts in said case comprising a pair of switching relay contacts having open and closed conditions and electrically connected in series with said overload breaker contacts, said switching relay contacts comprising a stationary contact, and a movable contact mounted on a movable contact arm having a first point pivotally mounted in said case for pivotal movement of said movable contact arm about said first point, an actuator in said case energizable to mechanically actuate said switching relay contacts and comprising an axially movable plunger engaging said movable contact arm at a second point and having a first position closing said switching relay contacts and a second position opening said switching relay contacts, a biasing spring bearing between said case and said movable contact arm at a third point and biasing said movable contact arm to bias said switching relay contacts to said closed condition, said movable contact of said switching relay contacts being mounted to said movable contact arm at a fourth point.

15. The circuit breaker according to claim 14 wherein said second point is between said first and third points, and said third point is between said second and fourth points.

16. The circuit breaker according to claim 14 comprising in combination magnetic flux coupling structure at said second point providing a hold down electromagnet urging said switching relay contacts to said closed condition with increasing force with increasing current flow therethrough, to reduce the holding requirements of said spring under overload current conditions, and such that said switching relay contacts remain closed and said overload breaker contacts break the circuit in the event of overload current.

17. The circuit breaker according to claim 16 wherein said magnetic flux coupling structure comprises a pole piece, and a movable armature including said movable contact arm, one of said pole piece and said armature comprising a U-shaped member having a bight and a pair of spaced legs extending toward the other of said pole piece and armature, and wherein said movable contact arm at said second point and said armature have an aperture through which said plunger extends.

18. The circuit breaker according to claim 14 wherein said plunger has first and second engagement surfaces axially spaced by a gap greater than the thickness of said movable contact arm at said second point, such that in said first position of said plunger, said first engagement surface of said plunger is spaced from said second point of said movable contact arm, and such that in said second position of said plunger, said first engagement surface of said plunger engages said second point of said movable contact arm.

19. A remote control residential and commercial circuit breaker providing overload current protection and load management comprising in combination in a common case, a first set of contacts in said case comprising a pair of separable overload breaker contacts, trip structure in said case for causing separation of said overload breaker contacts in response to overload currents therethrough, a second set of contacts in said case comprising a pair of switching relay contacts having open and closed conditions and electrically connected in series with said overload breaker contacts, said switching relay contacts comprising a stationary contact, and a movable contact mounted on a movable contact arm, an actuator in said case energizable to mechanically actuate said switching relay contacts and comprising a movable actuating member engaging said movable contact arm and having a first position closing said switching relay contacts and a second position opening said switching relay contacts, and a negative gradient acting spring biasing said movable contact arm to said first position of said movable actuating member and providing decreasing biasing force with increasing separation of said switching relay contacts as said movable actuating member moves from said first position to said second position.

20. The circuit breaker according to claim 19 wherein said biasing spring is angled at an oblique angle relative to the path of movement of said movable contact arm to provide said negative gradient.

21. The circuit breaker according to claim 19 comprising a lost motion coupling between said movable actuating member and said movable contact arm such that during movement of said movable actuating member from said first position to said second position, said movable actuating member initially moves through the lost motion, followed by hammer blow impact engagement of said movable contact arm by said movable actuating member to aid in breaking of tack welds between said switching relay contacts, followed by continued movement of said movable actuating member against the decreasing bias of said spring.

22. The circuit breaker according to claim 20 wherein said switching relay contacts engage along a plane obliquely angled relative to the direction of movement of said movable actuating member, which oblique plane of engagement is generally parallel to said oblique plane of said spring.

23. The circuit breaker according to claim 20 wherein said spring has a first position when said switching relay contacts are in said closed condition, said spring in said first position lying in a first plane obliquely angled relative to the direction of movement of said movable actuating member, said spring has a second position when said switching relay contacts are in said open condition, said spring in said second position lying in a second plane obliquely angled relative to the direction of movement of said movable actuating member, wherein said spring continually compresses during the entire range of motion thereof in changing from said first oblique plane to said second oblique plane during movement of said movable actuating member from said first position to said second position, and wherein said spring continually expands during the entire range of motion thereof in changing from said second oblique plane to said first oblique plane during movement of said movable actuating member from said second position to said first position.

24. The circuit breaker according to claim 18 comprising in combination magnetic flux coupling structure providing a hold down electromagnet adjacent said movable contact arm and urging said switching relay contacts to said closed condition with increasing force with increasing current flow therethrough, to reduce the holding requirements of said spring under overload current conditions, and such that said switching relay contacts remain closed and said overload breaker contacts break the circuit in the event of overload current.

25. The circuit breaker according to claim 24 wherein said magnetic flux coupling structure comprises a pole piece and a U-shaped armature having a bight engaging said movable contact arm and having a pair of spaced legs extending toward and movable into close proximity with said pole piece upon movement of said movable contact arm during movement of said movable actuating member from said second position to said first position, and wherein said movable actuating member comprises an axially movable plunger, said movable contact arm and said bight of said U-shaped armature have aligned apertures through which said plunger extends, said plunger has first and second engagement surfaces axially spaced by a gap greater than the combined thickness of said movable contact arm and said bight, such that in one of said positions of said plunger, said first engagement surface of said plunger engages a surface of said bight, and said second engagement surface of said plunger is spaced from a surface of said movable contact 20 arm, and such that in the other of said positions of said plunger, said second engagement surface of said plunger engages said surface of said movable contact arm, and said first engagement surface of said plunger is spaced from said surface of said bight.

26. A remote control residential and commercial circuit breaker providing overload current protection and load management, comprising in combination:
    a narrow case of width less than or equal to about one inch;
    a first set of contacts in said case comprising a pair of separable overload breaker contacts;
    trip structure in said case for causing separation of said overload breaker contacts in response to overload currents therethrough;
    a second set of contacts in said case comprising a pair of switching relay contacts having open and closed conditions and electrically connected in series with said overload breaker contacts; and
    an actuator in said case energizable to mechanically actuate said switching relay contacts.

27. The circuit breaker according to claim 26 further comprising in combination feedback means providing status indication of the condition of said switching relay contacts.

28. The circuit breaker according to claim 27 wherein said feedback means is responsive to said actuator.

29. The circuit breaker according to claim 26 comprising a third set of contacts in said case comprising auxiliary feedback contacts actuated by said actuator between open and closed conditions to provide status indication of the condition of said switching relay contacts.

30. A remote control residential and commercial circuit breaker providing overload current protection and load management, comprising in combination:
    a narrow case of width less than or equal to about one inch;
    a first set of contacts in said case comprising a pair of separable overload breaker contacts;
    trip structure in said case for causing separation of said overload breaker contacts in response to overload currents therethrough;
    a second set of contacts in said case comprising a pair of switching relay contacts having open and closed conditions and electrically connected in series with said overload breaker contacts; and
    an actuator in said case energizable to mechanically actuate said switching relay contacts,
    wherein said actuator comprises a movable actuating member having a first position closing said switching relay contacts and a second position opening said switching relay contacts, and comprising a feedback circuit responsive to movement of said movable actuating member to provide status indication of the position of said movable actuating member.

31. A remote control residential and commercial circuit breaker providing overload current protection and load management, comprising in combination:
    a narrow case of width less than or equal to about one inch;
    a first set of contacts in said case comprising a pair of separable overload breaker contacts;
    trip structure in said case for causing separation of said overload breaker contacts in response to overload currents therethrough;
    a second set of contacts in said case comprising a pair of switching relay contacts having open and closed conditions and electrically connected in series with said overload breaker contacts; and
    an actuator in said case energizable to mechanically actuate said switching relay contacts,
    wherein said actuator comprises a movable actuating member having a first position closing said switching relay contacts, and a second position opening said switching relay contacts, and comprising a third set of contacts in said case comprising first and second spaced contacts and a third contact movable between said first and second contacts and mounted on a movable contact arm lying in the path of movement of and engaged by said actuating member during movement between said first and second positions, such that said third contact of said third set engages said first contact of said third set when said actuating member is in said first position, and said third contact of said third set engages said second contact of said third set when said actuating member is in said second position, wherein closure of said first and third contacts of said third set indicates said closed condition of said switching relay contacts, and closure of said second and third contacts of said third set indicates said open condition of said switching relay contacts.

32. A remote control residential and commercial circuit breaker providing overload current protection and load management, comprising in combination:
    a narrow case of width less than or equal to about one inch;
    a first set of contacts in said case comprising a pair of separable overload breaker contacts;
    trip structure in said case for causing separation of said overload breaker contacts in response to overload currents therethrough;
    a second set of contacts in said case comprising a pair of switching relay contacts having open and closed conditions and electrically connected in series with said overload breaker contacts; and
    an actuator in said case energizable to mechanically actuate said switching relay contacts,
    wherein said actuator comprises a movable actuating member having a first position closing said switching relay contacts, and a second position opening said switching relay contacts, and comprising:
    a third set of contacts in said case comprising auxiliary feedback contacts actuated by said movable actuating member between open and closed conditions to provide status indication of the condition of said switching relay contacts; and a fourth set of contacts in said case comprising actuator energization control contacts actuated by said movable actuating member between open and closed conditions.

33. The circuit breaker according to claim 32 wherein said actuator comprises a solenoid, and said movable actuating member comprises a movable plunger actuated by said solenoid to move along an axial travel path, and wherein said third and fourth sets of contacts are spaced from each other transversely of said axial travel path and on opposite sides of said plunger.

34. The circuit breaker according to claim 33 wherein:
said plunger has first and second distally opposite trunnions extending outwardly therefrom;
said third set of contacts comprises a movable contact arm lying in the path of movement of and engaged by said first trunnion during axial movement of said plunger;
said fourth set of contacts comprises a movable contact arm lying in the path of movement of and engaged by said second trunnion during axial movement of said plunger.

35. The circuit breaker according to claim 34 wherein:
said third set of contacts comprises first and second axially spaced contacts, and a third contact on said movable contact arm of said third set and axially movable between said first and second contacts of said third set, such that said third contact of said third set engages said first contact of said third set when said plunger is in said first position, and said third contact of said third set engages said second contact of said third set when said plunger is in said second position, wherein closure of said first and third contacts of said third set indicates said closed condition of said switching relay contacts, and closure of said second and third contacts of said third set indicates said open condition of said switching relay contacts;
said fourth set of contacts comprises first and second axially spaced contacts, said second contact of said fourth set being mounted on said movable contact arm of said fourth set and axially movable between a first position engaging said first contact of said fourth set, and a second position separated from said first contact of said fourth set, such that said second contact of said fourth set engages said first contact of said fourth set when said plunger is in said first position, and said second contact of said fourth set is separated from said first contact of said fourth set when said plunger is in said second position.

36. A remote control residential and commercial circuit breaker providing overload current protection and load management, comprising in combination:
a narrow case of width less than or equal to about one inch;
a first set of contacts in said case comprising a pair of separable overload breaker contacts;
trip structure in said case for causing separation of said overload breaker contacts in response to overload currents therethrough;
a second set of contacts in said case comprising a pair of switching relay contacts having open and closed conditions and electrically connected in series with said overload breaker contacts; and
an actuator in said case energizable to mechanically actuate said switching relay contacts,
wherein:
said narrow case of width less than or equal to about one inch has first and second compartments;
said overload breaker contacts and said trip structure are in said first compartment;
said switching relay contacts and said actuator are in said second compartment;
said overload breaker contacts comprise a stationary contact, and a movable contact on a movable contact arm;
said trip structure comprises a latch for holding said movable breaker contact against said stationary breaker contact and being trippable to move said movable contact arm to separate said overload breaker contacts, and a bimetal member responsive to current flow therethrough inducing heating thereof to deflect said bimetal member to trip said latch;
said switching relay contacts comprise a stationary contact, and a movable contact on a movable contact arm;
said bimetal member has a first end connected by a first flexible pigtail conductor to said movable contact arm of said overload breaker contacts, and said bimetal member has a second end connected by a second flexible pigtail conductor to said movable contact arm of said switching relay contacts;
said case includes a dividing wall separating said first and second compartments and having a passage therethrough;
said second flexible pigtail conductor extends from said second end of said bimetal member through said passage and then along said dividing wall to said movable contact arm of said switching relay contacts;
said movable contact arm of said switching relay contacts has an end pivotally mounted in said second compartment;
said second flexible pigtail conductor is connected to said movable contact arm of said switching relay contacts adjacent said pivotally mounted end;
said dividing wall has a recessed bearing surface receiving and pivotally mounting said end of said movable contact arm of said switching relay contacts;
said actuator comprises a solenoid in said second compartment having an axially movable plunger; and
said second flexible pigtail conductor in said second compartment is disposed between said dividing wall and said solenoid and extends generally axially from said passage to said movable contact arm of said switching relay contacts.

* * * * *